(12) United States Patent
Yamazaki et al.

(10) Patent No.: US 8,530,718 B2
(45) Date of Patent: Sep. 10, 2013

(54) MITIGATION OF SECONDARY PHASE FORMATION DURING WASTE VITRIFICATION

(75) Inventors: Akito Yamazaki, Kanagawa (JP); Yoshihiro Endo, Kanagawa (JP); Katsuyuki Shirato, Kanagawa (JP); Kunihiko Nakano, Kanagawa (JP); Ian L. Pegg, Alexandria, VA (US); Hao Gan, Gaithersburg, MD (US); Keith Matlack, Annandale, VA (US); Innocent Joseph, Ellicott City, MD (US); Bradley W. Bowan, II, Bethesda, MD (US)

(73) Assignee: EnergySolutions, LLC, Salt Lake City, UT (US)

( * ) Notice: Subject to any disclaimer, the term of this patent is extended or adjusted under 35 U.S.C. 154(b) by 505 days.

(21) Appl. No.: 12/677,490

(22) PCT Filed: Sep. 15, 2008

(86) PCT No.: PCT/US2008/076381
§ 371 (c)(1),
(2), (4) Date: Mar. 10, 2010

(87) PCT Pub. No.: WO2009/039059
PCT Pub. Date: Mar. 26, 2009

(65) Prior Publication Data
US 2010/0285945 A1 Nov. 11, 2010

(30) Foreign Application Priority Data
Sep. 20, 2007 (JP) ................................. 2007-244041

(51) Int. Cl.
*G21F 9/16* (2006.01)
(52) U.S. Cl.
USPC .............................................. 588/11; 588/412
(58) Field of Classification Search
USPC ............... 588/1, 2, 10, 11, 18, 252, 410, 412, 588/900, 901
See application file for complete search history.

(56) References Cited

U.S. PATENT DOCUMENTS

| 4,797,232 A | 1/1989 | Aubert |
| 5,530,174 A | 6/1996 | Kawamura et al. |
| 5,573,564 A | 11/1996 | Richards |

OTHER PUBLICATIONS

International Search Report and Written Opinion, PCT/US2008/76381, Nov. 25, 2008 (8 pages).

*Primary Examiner* — Edward Johnson
(74) *Attorney, Agent, or Firm* — Holland & Hart

(57) ABSTRACT

A method for vitrification of high level waste to reduce the formation of persistent secondary phases comprising the steps of providing a high level waste for vitrification; providing a glass frit additive for mixing with said high level waste; redistributing selected constituents of said glass frit for mixing separately as raw chemicals with said high level waste; and, feeding said high level waste, said glass frit additive, and the redistributed glass frit constituents to a melter for vitrification of said high level waste so that formation of secondary phases is suppressed.

30 Claims, 1 Drawing Sheet

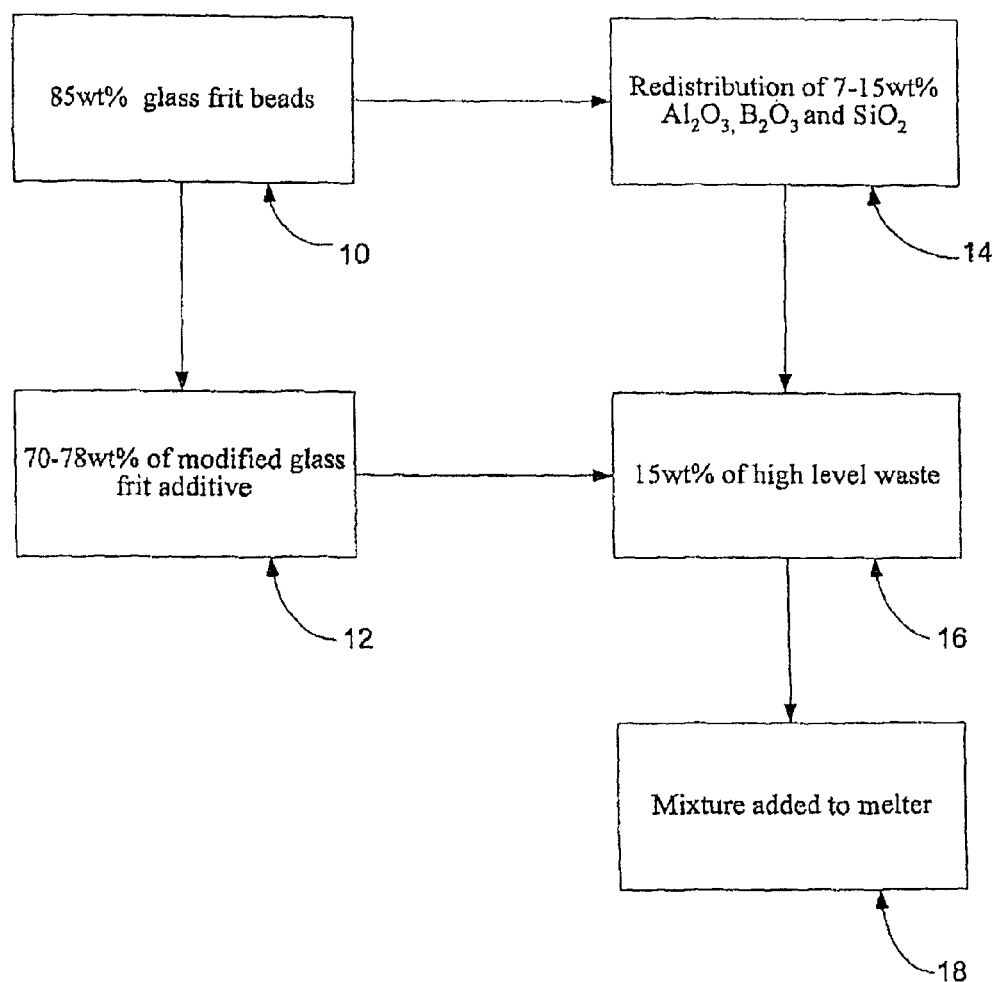

US 8,530,718 B2

MITIGATION OF SECONDARY PHASE FORMATION DURING WASTE VITRIFICATION

CROSS REFERENCE TO RELATED APPLICATION/CLAIM OF PRIORITY

This application claims priority under 35 USC §119 from Japanese application serial no. 2007-244041, filed Sep. 20, 2007.

BACKGROUND OF THE INVENTION

1) Field of the Invention

The present invention relates to improvements in the process for vitrifying waste materials, and more particularly, to improvements especially for the vitrification of radioactive waste materials by changing the chemical form and physical characteristics of additives that are added to the waste material to obtain a suitable vitrified product, such that the reactions between the additives and the waste materials suppress the formation of undesirable secondary phases.

2) Description of Related Art

Large quantities of radioactive nuclear waste materials that are produced as byproducts from activities such as weapons programs, nuclear fuel recycling, medical isotope production, are stored in various countries around the world. Vitrification of these waste materials to produce a durable glass product is the preferred approach for treating and disposing of these waste materials because of the high durability of the glass waste form as compared to other waste forms such as grout. Vitrification of radioactive high level waste (HLW) to produce a borosilicate glass product is the internationally accepted waste treatment method. Vitrification of the waste materials is done in melters such as Joule Heated Ceramic Melters (JHCM), Induction Melters (IM), Cold Crucible Melters (CCM), and the like.

In waste vitrification, the waste materials are mixed with appropriate amounts of raw materials, know as "additives", and melted at a high temperature (typically 1150° C. for JHCMs, typically somewhat lower for IMs, and typically somewhat higher for CCMs) in order to produce glass products that meet pre-specified product quality requirements. The product quality requirements mostly relate to the chemical durability of the glass product as measured by standard test procedures.

Many waste materials are stored in tanks in slurry or solution form. The additives have been used either in the form of pre-melted chemicals (frit) with a specified composition, or raw materials in the form of minerals or chemicals. The additive minerals or chemicals are commonly referred to as glass forming chemicals (GFCs). In either case, the waste materials with the additives are designed to melt and form a glass product with a predetermined oxide composition. The waste materials mixed with the appropriate amounts of frit or GFCs are referred to as melter feeds. These materials may be mixed either outside or inside the melter.

In many situations, the melter feed is introduced from the top of the melter to the melt pool surface so that a layer of feed material covers the hot glass melt underneath. This layer is commonly referred to as the cold-cap. The cold-cap extends from partially melted melter feed in contact with the melt pool to unreacted melter feed at the top. In other situations such as batch-style induction melters, the melt zone progresses from the hot wall on the outside into the bulk. Consequently, in this case also there is a boundary zone between predominantly melted material and predominantly unmelted feed material. This zone is also referred to as a cold cap. Reactions in the cold-cap, and controlling these reactions, are the key approach to mitigating undesirable secondary phase formation.

Due to the complexity of the waste materials, and the number of different constituents, persistent secondary phases are often formed during the melting process. The extent of formation of these secondary phases depend on various factors such as concentrations of troublesome constituents, the types of additives, waste processing rates, processing temperatures, etc. One of the common waste constituents that show a tendency to form secondary phases during nuclear waste vitrification is molybdenum. Formation of secondary molybdate phases is undesirable because they lead to both processing and product quality issues. Molybdate phases are easily leachable, leading to unacceptable product quality. In addition, these secondary phases tend to selectively incorporate high concentrations of other components such as cesium leading to additional product quality issues. Alkali molybdate phases can accumulate on the melt surface causing excessive corrosion of melter components that are in contact with this phase. Alkaline earth molybdates tend to sink to the bottom of the melter and accumulate. The accumulation of molybdate secondary phases at the melter bottom can cause problems with glass discharge, especially for melters that use a bottom discharge.

The molybdate phase formation is a result of the high molybdenum concentration in the HLW feed to the vitrification facility in combination with complex reaction kinetics in the cold-cap. The molybdenum secondary phase formation initially occurs near the interface between the molten glass pool and the cold-cap. Our studies showed that kinetically controlled cold-cap conversion processes are responsible for the generation of molten molybdate salt, rather than solubility limits of molybdates in the underlying glass melt.

When the melter feed is prepared by mixing glass frit with the HLW material in slurry form, or when HLW is fed continuously and glass frit is fed periodically in small batches to the center of the cold-cap, the molybdate secondary phase tends to form before the underlying glass melt reaches saturation with respect to molybdate. If the feed chemistry can be altered to suppress the molybdate secondary phase formation until its concentration reaches close to the solubility limit, the amount of waste incorporated into unit amount of glass produced (waste loading) can be increased leading to substantial cost savings in HLW treatment and disposal.

Sulfur is another component in waste streams that at high concentrations causes the formation of secondary sulfate layers during the melting process. The sulfate concentration in the glass that causes secondary phase formation can be as low as 0.5 wt % in certain glass compositions. In this case also, the secondary sulfate layer is formed well before the underlying glass melt reaches sulfate solubility limit. Again, improvements to the feed chemistry by judicious choice of additives to delay the formation of sulfate secondary phases until the sulfate concentration reaches close to the solubility limit, has enormous economical advantage. The same principles should be effective for mitigating other troublesome salt-forming species such as chlorine, fluorine, chromium (chromate), and phosphorous.

Accordingly, it is an object of the present invention to provide improved efficiency for vitrification of waste material, especially for radioactive waste materials.

It is a further object of the present invention to reduce the tendency to form secondary phases during vitrification by tailoring the glass former additives, thus increasing the amount of waste incorporated into unit amount of glass produced.

SUMMARY OF THE INVENTION

The above objectives are accomplished according to the present invention by providing a method for vitrification of high level waste to reduce the formation of persistent secondary phases comprising the steps of providing a high level waste for vitrification; providing a glass frit additive for mixing with the high level waste; providing at least one glass frit constituent selected from the group consisting of $Al_2O_3$, $B_2O_3$, and $SiO_2$ separately from the glass frit additive for mixing with the high level waste; and, feeding the high level waste, the glass frit additive and the glass frit constituent to a melter to form a mixture for vitrification of the high level waste in which formation of secondary phases is suppressed.

In a further advantageous embodiment, the method includes the step of providing the glass frit additive in the form selected from the group consisting of glass beads, cylindrical glass fiber cartridges, glass powder, and glass flakes.

In a further advantageous embodiment, the method includes the step of redistributing selected components of the glass frit additive into individual glass frit constituents for mixing as raw chemicals with the high level waste separately from the glass frit additive.

In a further advantageous embodiment, the method includes the step of redistributing all components of the glass frit additive into individual glass frit constituents for mixing as raw chemicals with the high level waste.

In a further advantageous embodiment, the method includes the step of providing the glass frit additive having $Al_2O_3$, $B_2O_3$, and $SiO_2$, and redistributing at least a portion of at least one of the $Al_2O_3$, $B_2O_3$, and $SiO_2$ from the glass frit additive to provide at least one redistributed glass frit constituent for mixing separately as raw chemicals with the high level waste.

In a further advantageous embodiment, the method includes the step of redistributing all of the $Al_2O_3$ and a portion of the $B_2O_3$ from the glass frit additive to individual glass frit constituents for mixing separately with the high level waste so that the removed $Al_2O_3$ and $B_2O_3$ totals approximately at least 7 wt % by weight of the mixture.

In a further advantageous embodiment, the method includes the step of combining 15.81 wt % of the high level waste, 77.29 wt % of the glass frit additive, and 6.9 wt % of the $Al_2O_3$ and $B_2O_3$ for feeding to the melter.

In a further advantageous embodiment, the method includes the step of redistributing all of the $Al_2O_3$ and a portion of the $B_2O_3$ and the $SiO_2$ from the glass frit additive to individual glass frit constituents for mixing separately with the high level waste so that the removed $Al_2O_3$ and $B_2O_3$ totals approximately 7 wt % and the $SiO_2$ totals approximately 7 wt % of the mixture.

In a further advantageous embodiment, the method includes the step of combining 15.81 wt % of the high level waste, 70.56 wt % of the glass frit additive, 6.9 wt % of the redistributed $Al_2O_3$ and $B_2O_3$ and 6.73 wt % of the redistributed $SiO_2$ for feeding to the melter.

In a further advantageous embodiment, the method includes the step of separately feeding the high level waste, the glass frit additive and the at least one glass frit constituent to the melter.

In a further advantageous embodiment, the method includes the step of mixing the high level waste, the glass frit additive and the at least one glass frit constituent together and feeding the resulting mixture to the melter.

In a further advantageous embodiment, the method includes the step of mixing the high level waste with the at least one glass frit constituent prior to feeding to the melter.

In a further advantageous embodiment, the method includes the step of providing the high level waste, the glass frit additive, and the at least one glass frit constituent in powder form for feeding to the melter.

In a further advantageous embodiment, a composition is made according to the method described above comprising about 15 wt % of the high level waste, about 70%-78 wt % of the glass frit additive, and about 7 wt %-15 wt % of the glass frit constituent selected from the group consisting of $Al_2O_3$, $B_2O_3$, and $SiO_2$ for feeding to a melter to form a borosilicate glass compound.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 1 shows a flow chart of the method for mitigation of secondary phase formation during waste vitrification according to the present invention.

DETAILED DESCRIPTION OF A PREFERRED EMBODIMENT

With reference to FIG. 1, the invention will now be described in more detail. In studies designed to develop and demonstrate the invention, oxide compositions were formed by combining 15.81 wt % of High Level Waste (HLW) simulant and 84.19 wt % of glass frit. The HLW simulant contained about 8.64 wt % of $MoO_3$ for conducting the process discussed herein. The glass composition used in the studies had a waste loading of 15.81 wt %. The resulting glass had $MoO_3$ concentration of 1.37 wt %.

Additives for mixing with the waste material were provided in the form of pre-melted glass frit beads. The 15.81 wt % of HLW simulant is provided in slurry form. Appropriate amounts of glass frit beads, totaling approximately 84.19%, were added so that the resulting glass melt formed the desired oxide composition having the characteristics noted above.

Heat treatment of the mixture in the range of 700 to 900° C. in gradient or isothermal furnaces resulted in the formation of the undesirable molybdate phases. Both alkali and alkaline earth molybdates were identified. Even though the nominal operating temperature of a typical glass melter is 1150° C., formation of molybdate phases at any temperature in the range of 100 to 1150° C. is of concern because the temperature in the cold-cap region ranges from about 100° C. at the top surface to about 1150° C. at the glass melt interface.

Next, a set of tests was designed to identify changes to the above formulation by manipulating the additives that would eliminate molybdate phase formation without any changes to the resulting product glass composition. As detailed herein below, this is accomplished by removing a portion of the additives from the glass frit prior to combination with the HLW slurry, reformulating the frit, and adding the components removed from the glass frit directly to the HLW slurry.

Crucible-scale tests were conducted to identify the most promising frit modifications to eliminate molybdate phase formation. It was found that removal of all $Al_2O_3$ and part of the $B_2O_3$ from the glass frit, and the addition of the removed $Al_2O_3$ and $B_2O_3$ directly to the HLW slurry separately from the glass frit was an effective approach to the suppression of molybdate phase formation. To confirm this observation, a test was conducted in a continuously fed, Joule Heated Ceramic Melter (JHCM) during which about 20 kg of glass was produced over a period of about 64 hours. The combination added to the melter of the HLW simulant, the modified glass frit, the $Al_2O_3$ and $B_2O_3$ additives removed from the glass frit and added directly to the HLW simulant, resulted in a final glass composition that was unchanged but eliminated the problematic secondary phase formations.

About 10% by weight of the $Al_2O_3$ and $B_2O_3$ additives contained in the glass frit were removed and added directly to the HLW simulant. Preferably, this includes removing all of the $Al_2O_3$. Removal of $B_2O_3$ from the glass frit comprises the remainder of the 10% by weight being removed from the glass frit. In total, removal of all the $Al_2O_3$ and a portion of the $B_2O_3$ comprises 10% by weight of the total glass frit.

In a preferred embodiment, the target glass composition was obtained by combining 15.81 wt % of HLW simulant, 77.29 wt % of the modified glass frit, and 6.9 wt % of the removed $Al_2O_3$ and $B_2O_3$. The waste loading and the final glass composition were unchanged as desired. At the end of the test, examination showed the melter glass to be free of separate molybdate phases. The addition of all the $Al_2O_3$ and part of the $B_2O_3$ removed from the glass frit directly to the HLW simulant suppresses molybdate phase formation by being more effective at minimizing molybdate phase formation in the cold-cap area so that it does not accumulate. It also promotes the formation of desirable transient phases that incorporate molybdenum, thereby preventing the formation and segregation of a separate molybdate phase. Small molybdate droplets that may form in the cold-cap area are redissolved, thereby preventing the accumulation of molybdate phases in the melter. These tests were designed such that redistribution of the original frit constituents between the modified frit and the HLW simulant will result in minimal changes to the overall process.

Additional crucible tests were conducted to identify other promising frit modifications to eliminate molybdate phase formation. It was found that redistribution of all $Al_2O_3$ and part of the $B_2O_3$ and $SiO_2$ from the glass frit, and the addition of the removed $Al_2O_3$, $B_2O_3$ and $SiO_2$ directly to the HLW slurry separately from the glass frit was an even more effective approach to the suppression of molybdate phase formation than the redistribution of $Al_2O_3$ and $B_2O_3$ alone.

In a further advantageous embodiment, the target glass composition was obtained by combining 15.81 wt % of HLW simulant, 70.56 wt % of the modified glass frit, 6.9 wt % of the removed $Al_2O_3$ and $B_2O_3$ and 6.73 wt % of removed $SiO_2$. The waste loading and the final glass composition were unchanged as desired. Examination of the heat treated crucible glass samples showed them to be free of separate molybdate phases.

The above tests conclusively demonstrated that redistribution of frit constituents is an effective method to suppress the formation and accumulation of separate molybdate phases during HLW simulant feed processing in JHCMs. In initial tests, only about 7%-10% by weight of the glass frit constituents were redistributed, which provided acceptable results. Further crucible tests showed that redistribution of about 15% by weight of selected amounts of glass frit constituents including $Al_2O_3$, $B_2O_3$ and $SiO_2$ was even more effective in suppressing separate molybdate phase formation.

Accordingly, a method for vitrification of high level waste to reduce the formation of persistent secondary phases is disclosed that comprises the steps of providing about 15% of a high level waste for vitrification (16); providing about 85% of a glass frit additive for mixing with the high level waste (10); redistributing at least about 7%-15% by weight of the glass frit constituents (14) for mixing separately with the high level waste so that less than approximately 70%-78% of the total mixture comprises the glass frit (12); and, feeding the high level waste, the glass frit, and the redistributed glass frit constituents to a melter (18) for vitrification of the high level waste so that formation of secondary phases is suppressed.

Different variations of the invention that will also improve the suppression of secondary phase formations include: 1) redistribution of a higher percentage of the glass frit components to be added separately to the HLW slurry; 2) complete replacement of glass frit with raw chemicals that are added directly to the HLW slurry; 3) redistribution of glass frit components without change to the product glass composition; 4) redistribution of glass frit components and reformulation of the glass with change to the product glass composition; 5) redistribution of glass frit components in any of the ways described above to suppress secondary phase formation in an existing glass composition; 6) redistribution of glass frit components in any of the ways described above to suppress secondary phase formation so that waste loading in the glass can be increased; 7) Redistribution of glass frit components in any of the ways described above where the frit is in the form of glass beads (nominally 2 to 3 mm in diameter); 8) redistribution of glass frit components in any of the ways described above where the frit is in the form cylindrical glass fiber cartridges (nominally 70 mm diameter and 70 mm length); 9) redistribution of glass frit components in any of the ways described above where the frit is in the form of a powder (nominally less than 80 mesh); 10) redistribution of glass frit components in any of the ways described above where the frit is in the form of glass flakes.

The above innovations can be implemented in any and all of the following glass making processes: 1) JHCM in which the glass frit and HLW slurry with the redistributed glass frit components are fed separately to the melter; 2) JHCM in which the glass frit and HLW slurry with the redistributed glass frit components are mixed and fed together to the melter; 3) JHCM in which the glass frit, the redistributed glass frit components and calcined HLW are fed to the melter as solid powders; 4) Cold Crucible Melters (CCM) in which the glass frit and HLW slurry with the redistributed glass frit components are fed separately to the melter; 5) CCM in which the glass frit and HLW slurry with the redistributed glass frit components are mixed and fed together to the melter; 6) CCM in which the glass frit, the redistributed glass frit components, and calcined HLW are fed to the melter as solid powders; 7) Induction Melters (IM) in which the glass frit and HLW slurry with the redistributed glass frit components are fed separately to the melter; 8) IM in which the glass frit and HLW slurry with the redistributed glass frit components are mixed and fed together to the melter; 9) IM in which the glass frit, the redistributed glass frit components, and calcined HLW are fed to the melter as solid powders.

The invention has application in the suppression of secondary phases formed by molybdenum and sulfur and the same principles should be effective for mitigating other troublesome salt-forming species such as chlorine, fluorine, chromium (chromate), and phosphorous.

While a preferred embodiment of the invention has been described using specific terms, such description is for illustrative purposes only, and it is to be understood that changes and variations may be made without departing from the spirit or scope of the following claims.

What is claimed is:

1. A method for vitrification of high level waste to reduce the formation of persistent secondary phases comprising the steps of:
   providing a high level waste for vitrification;
   providing a glass frit additive for mixing with said high level waste;
   providing at least one glass frit constituent selected from the group consisting of $Al_2O_3$, $B_2O_3$, and $SiO_2$ separately from said glass frit additive for mixing with said high level waste; and,
   feeding said high level waste, said glass frit additive and said glass frit constituent to a melter to form a mixture for vitrification of said high level waste in which formation of secondary phases is suppressed.

2. The method of claim 1 including the step of providing said glass frit additive in the form selected from the group consisting of glass beads, cylindrical glass fiber cartridges, glass powder, and glass flakes.

3. The method of claim 1 including the step of redistributing selected components of said glass frit additive into individual glass frit constituents for mixing as raw chemicals with said high level waste separately from said glass frit additive.

4. The method of claim 1 including the step of redistributing all components of said glass frit additive into individual glass frit constituents for mixing as raw chemicals with said high level waste.

5. The method of claim 1 including the step of providing said glass frit additive having $Al_2O_3$, $B_2O_3$, and $SiO_2$, and redistributing at least a portion of at least one of said $Al_2O_3$, $B_2O_3$, and $SiO_2$ from said glass frit additive to provide at least one redistributed glass frit constituent for mixing separately as raw chemicals with said high level waste.

6. The method of claim 5 including the step of redistributing all of said $Al_2O_3$ and a portion of said $B_2O_3$ from said glass frit additive to individual glass frit constituents for mixing separately with said high level waste so that the removed $Al_2O_3$ and $B_2O_3$ totals approximately at least 7 wt % by weight of said mixture.

7. The method of claim 6 including the step of combining 15.81 wt % of said high level waste, 77.29 wt % of said glass frit additive, and 6.9 wt % of said $Al_2O_3$ and $B_2O_3$ for feeding to said melter.

8. The method of claim 5 including the step of redistributing all of said $Al_2O_3$ and a portion of said $B_2O_3$ and said $SiO_2$ from said glass frit additive to individual glass frit constituents for mixing separately with said high level waste so that the removed $Al_2O_3$ and $B_2O_3$ totals approximately 7 wt % and said $SiO_2$ totals approximately 7 wt % of said mixture.

9. The method of claim 8 including the step of combining 15.81 wt % of said high level waste, 70.56 wt % of said glass frit additive, 6.9 wt % of said redistributed $Al_2O_3$ and $B_2O_3$ and 6.73 wt % of said redistributed $SiO_2$ for feeding to said melter.

10. The method of claim 1 including the step of separately feeding said high level waste, said glass frit additive and said at least one glass frit constituent to said melter.

11. The method of claim 1 including the step of mixing said high level waste, said glass frit additive and said at least one glass frit constituent together and feeding the resulting mixture to said melter.

12. The method of claim 1 including the step of mixing said high level waste with said at least one glass frit constituent prior to feeding to said melter.

13. The method of claim 1 including the step of providing said high level waste, said glass frit additive, and said at least one glass frit constituent in powder form for feeding to said melter.

14. A composition made according to the method of claim 1 comprising about 15 wt % of said high level waste, about 70%-78 wt % of said glass frit additive, and about 7 wt %-15 wt % of said glass frit constituent selected from the group consisting of $Al_2O_3$, $B_2O_3$, and $SiO_2$ for feeding to a melter to form a borosilicate glass compound.

15. A method for vitrification of high level waste to reduce the formation of persistent secondary phases comprising the steps of:
   providing about 15 wt % of a high level waste for vitrification;
   providing about 85 wt % of a glass frit additive for mixing with said high level waste;
   redistributing about 7 wt %-15 wt % of selected components of said glass frit additive for mixing separately as individual glass frit constituents with said high level waste; and,
   feeding said high level waste, said glass frit additive, and said individual glass frit constituents to a melter to form a mixture for vitrification of said high level waste in which formation of secondary phases is suppressed.

16. The method of claim 15 including the step of providing said glass frit additive having $Al_2O_3$, $B_2O_3$, and $SiO_2$, and redistributing at least a portion of at least one of said $Al_2O_3$, $B_2O_3$, and $SiO_2$ from said glass frit additive for mixing as said individual glass frit constituents with said high level waste.

17. The method of claim 16 including the step of redistributing all of said $Al_2O_3$ and a portion of said $B_2O_3$ from said glass frit additive to said individual glass frit constituents for mixing separately with said high level waste so that the removed $Al_2O_3$ and $B_2O_3$ totals approximately at least 7 wt % by weight of said mixture.

18. The method of claim 17 including the step of combining 15.81 wt % of said high level waste, 77.29 wt % of said glass frit additive, and 6.9 wt % of said $Al_2O_3$ and $B_2O_3$ for feeding to said melter.

19. The method of claim 16 including the step of redistributing all of said $Al_2O_3$ and a portion of said $B_2O_3$ and said $SiO_2$ from said glass frit additive to individual glass frit constituents for mixing separately with said high level waste so that the removed $Al_2O_3$ and $B_2O_3$ totals approximately 7 wt % and said $SiO_2$ totals approximately 7 wt % of said mixture.

20. The method of claim 19 including the step of combining 15.81 wt % of said high level waste, 70.56 wt % of said glass frit additive, 6.9 wt % of said $Al_2O_3$ and $B_2O_3$ and 6.73 wt % of said $SiO_2$ for feeding to said melter.

21. The method of claim 15 including the step of separately feeding said high level waste, said glass frit additive and said individual glass frit constituents to said melter.

22. The method of claim 15 including the step of mixing said high level waste, said glass frit additive and said individual glass frit constituents together and feeding the resulting mixture to said melter.

23. The method of claim 15 including the step of mixing said high level waste with said individual glass frit constituents prior to feeding to said melter.

24. The method of claim 15 including the step of providing said high level waste, said glass frit additive, and said individual glass frit constituents in powder form for feeding to said melter.

25. A composition made according to the method of claim 15 comprising about 15 wt % of said high level waste, about 70%-78 wt % of said glass frit additive, and about 7 wt %-15 wt % of said individual glass frit constituents selected from the group consisting of $Al_2O_3$, $B_2O_3$, and $SiO_2$ for feeding to a melter to form a borosilicate glass compound.

26. A method for vitrification of high level waste to reduce the formation of persistent secondary phases comprising the steps of:
providing a high level waste for vitrification;
providing a glass frit additive for mixing with said high level waste;
redistributing select amounts of individual glass frit constituents of said glass frit additive for mixing separately as raw chemicals with said high level waste; and,
feeding said high level waste, said glass frit additive, and said individual glass frit constituents to a melter for vitrification of said high level waste so that formation of secondary phases is suppressed.

27. The method of claim 26 including the step of providing said glass frit additive having $Al_2O_3$, $B_2O_3$, and $SiO_2$, and redistributing at least a portion of at least one of said $Al_2O_3$, $B_2O_3$, and $SiO_2$ from said glass frit additive for mixing as said individual glass frit constituents with said high level waste.

28. The method of claim 27 including the step of combining 15.81 wt % of said high level waste, 77.29 wt % of said glass frit additive, and 6.9 wt % of said $Al_2O_3$ and $B_2O_3$ for feeding to said melter.

29. The method of claim 27 including the step of combining 15.81 wt % of said high level waste, 70.56 wt % of said glass frit additive, 6.9 wt % of said $Al_2O_3$ and $B_2O_3$ and 6.73 wt % of said $SiO_2$ for feeding to said melter.

30. A composition made according to the method of claim 26 comprising about 15 wt % of said high level waste, about 70%-78 wt % of said glass frit additive, and about 7 wt %-15 wt % of said individual glass frit constituents selected from the group consisting of $Al_2O_3$, $B_2O_3$, and $SiO_2$ for feeding to a melter to form a borosilicate glass compound.

* * * * *